(12) United States Patent
Sasaki et al.

(10) Patent No.: US 7,370,998 B2
(45) Date of Patent: May 13, 2008

(54) LIGHTING FIXTURE UNIT AND VEHICULAR HEADLAMP

(75) Inventors: Masaru Sasaki, Shizuoka (JP); Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/285,357

(22) Filed: Nov. 23, 2005

(65) Prior Publication Data

US 2006/0109672 A1 May 25, 2006

(30) Foreign Application Priority Data

Nov. 24, 2004 (JP) .......................... P.2004-338874

(51) Int. Cl.
*F21Y 21/14* (2006.01)

(52) U.S. Cl. ................. 362/545; 362/544; 362/250; 362/231; 362/523; 362/532

(58) Field of Classification Search ............ 362/543, 362/544, 545, 250, 800, 231, 285, 287, 418, 362/512, 523, 531, 532
See application file for complete search history.

(56) References Cited

U.S. PATENT DOCUMENTS

| 6,585,395 B2 * | 7/2003 | Luk ............................ 362/250 |
| 7,114,828 B2 * | 10/2006 | Yagi ............................ 362/231 |
| 7,134,775 B2 * | 11/2006 | Oishi et al. ................. 362/545 |

FOREIGN PATENT DOCUMENTS

JP          2004-241138 A      8/2004

* cited by examiner

*Primary Examiner*—Thomas M. Sember
(74) *Attorney, Agent, or Firm*—Sughrue Mion, PLLC

(57) ABSTRACT

A vehicular headlamp including a lighting fixture unit that emits white light in upper beam irradiation and emits infrared light in lower beam irradiation. The lighting fixture unit includes: a light source part including a first semiconductor light-emitting element as a white light source and a second semiconductor light-emitting element as an infrared light source; an optical member for irradiating in forward direction the light from each semiconductor light-emitting element; and an optical axis adjusting unit for changing in a vertical plane the direction of optical axis related to the first and second semiconductor light-emitting elements.

18 Claims, 6 Drawing Sheets

LIGHTING FIXTURE UNIT AND VEHICULAR HEADLAMP

This application claims foreign priority from Japanese Patent Application No. 2004-338874, filed Nov. 24, 2004, the entire disclosure of which is herein incorporated by reference.

BACKGROUND OF THE INVENTION

1. Technical Field

The present invention is directed to a lighting fixture unit including semiconductor light-emitting elements. The lighting fixture unit can be used, for example, in a vehicular headlamp. The technology allows formation of a light distribution in upper beam irradiation and an infrared light distribution in lower beam irradiation.

2. Description of Related Art it is known to use an infrared noctovision camera system to make an obstacle, which is difficult to perceive with visible light, visible during night traveling by using illuminated infrared rays. An infrared floodlight is used as an active-type element of such a system.

When the infrared floodlight is provided as a lighting fixture unit that is separate from a vehicular headlamp, there exist the problems of an increased number of units and an increased unit size. Thus, a configuration using a lighting fixture unit, having a light source that includes a white light source and an infrared light source in a package, is known.

For example, there is a configuration in which separate light-emitting diodes (LEDs) are used for visible light and for infrared light, and a reflector is included. This configuration includes an LED for visible light and an LED for infrared light provided in close proximity to one another. Visible light and infrared light emitted from these elements are reflected in a forward direction by a reflector (for example, refer to JP-A-2004-241138).

Illumination by such a vehicular headlamp includes an upper beam (beam for traveling) irradiation configuration and a lower beam (beam for passing) irradiation configuration. For example, in the following configurations, the lighting fixture units are discriminated based on this feature.

(1) A configuration where a light-emitting element for lower beam irradiation and an infrared light-emitting element are packaged; and (2) a configuration where a light-emitting element for upper beam irradiation and an infrared light-emitting element are packaged.

In the configuration (1), for example, a white LED for lower beam irradiation is arranged on a board and an infrared LED is arranged in close proximity to the element. In a lighting fixture unit using these elements as a light source, both of the elements are caused to illuminate in lower beam irradiation.

For example, in the configuration (2), a white LED for upper beam irradiation is arranged on a board, and an infrared LED is arranged in close proximity to the white LED. In a lighting fixture unit using these elements as a light source, only the white LED is caused to illuminate in upper beam irradiation, while only the infrared LED is caused to illuminate in lower beam irradiation.

The above configurations (1) and (2) have the following problems related to application of the invention to a vehicular headlamp.

For example, in the configuration (1), two LEDs illuminate at the same time in lower beam irradiation. This requires a large-scale structure or members (such as a heat sink) used for heat radiation of the LEDs.

In the configuration (2), the problem is that the light distribution related to the white LED for upper beam irradiation is the same as that related to the infrared LED for lower beam irradiation. To be more precise, the center of emission of each of these LEDs cannot be specified to the same position. Using one of the centers of emission causes an influence of dislocation on the other. Setting the emission position of each LED by using an intermediate position of the centers of emission causes an influence of dislocation on both LEDs. Forming the same light distribution using individual LED light sources set in separate positions on the same board is difficult or leads to a complicated arrangement in terms of optical design.

SUMMARY OF THE INVENTION

An object of the invention is to provide a lighting fixture unit using a white light-emitting element and an infrared light-emitting element that can be used in a vehicular headlamp.

The invention provides a lighting fixture unit that emits white light in upper beam irradiation of a vehicular headlamp and that emits infrared light in lower beam irradiation of the vehicular headlamp and a vehicular headlamp using the lighting fixture unit. The lighting fixture unit includes: a light source part including a first semiconductor light-emitting element for emitting the white light and a second semiconductor light-emitting element for emitting the infrared light; an optical member for irradiating in forward direction the light from the first semiconductor light-emitting element or the second semiconductor light-emitting element; and optical axis adjusting means for changing in a vertical plane the direction of optical axis related to the first and second semiconductor light-emitting elements.

In a configuration using a light-emitting diode for the first and second semiconductor light-emitting elements, the first semiconductor light-emitting element is preferably positioned in the close proximity to the second semiconductor light-emitting element relatively above the second element so as to cause white light or infrared light to pass through a lens and be emitted in forward direction. The optical axis direction in upper beam irradiation is adjusted upward with respect to the optical axis direction in lower beam irradiation. This implements a simple configuration using the direct light of a light-emitting diode.

For application to a vehicular headlamp, a preferable configuration includes a first lighting fixture unit that emits white light in upper beam irradiation and emits infrared light in lower beam irradiation and a second lighting fixture unit used in upper beam irradiation and lower beam irradiation as well as leveling means (direction adjusting means in a vertical plane including the irradiation optical axis) for shifting the irradiation optical axis of the second lighting fixture unit upward in upper beam irradiation. By using the optical adjusting means also as leveling means in order to tilt upward the optical axis of the first semiconductor light-emitting element and the irradiation optical axis of the second lighting fixture unit in upper beam irradiation with respect to lower beam irradiation. Both adjustment tasks are simultaneously made by a single operation and by the same adjustment amount. This is advantageous in providing a simpler mechanism and reduction of the number of components used.

BRIEF DESCRIPTION OF THE DRAWINGS

The advantages, nature and various additional features of the invention will appear more fully upon consideration of the exemplary embodiment of the invention, which is schematically set forth in the drawings, in which.

DETAILED DESCRIPTION OF THE EXEMPLARY EMBODIMENT

Although the invention will be described below with reference to an exemplary embodiment thereof, the following exemplary embodiment does not restrict the invention.

According to the exemplary embodiment of the invention, a first semiconductor light-emitting element and a second semiconductor light-emitting element do not illuminate simultaneously. An optical axis adjusting means is provided for changing in a vertical plane the direction of an optical axis related to these elements so that it is possible to obtain necessary light distribution for a vehicle by adjusting the direction of irradiation of the lighting fixture unit.

Moreover, according to the exemplary embodiment of the invention, simultaneous lighting of the light-emitting elements is avoided to prevent an increase in the total calorific value. By adjusting the optical axis direction related to the first and second semiconductor light-emitting elements, it is possible to irradiate white light in upper beam irradiation in a predetermined direction. This is advantageous because it can reduce costs without complicating the optical configuration.

Figure 1:
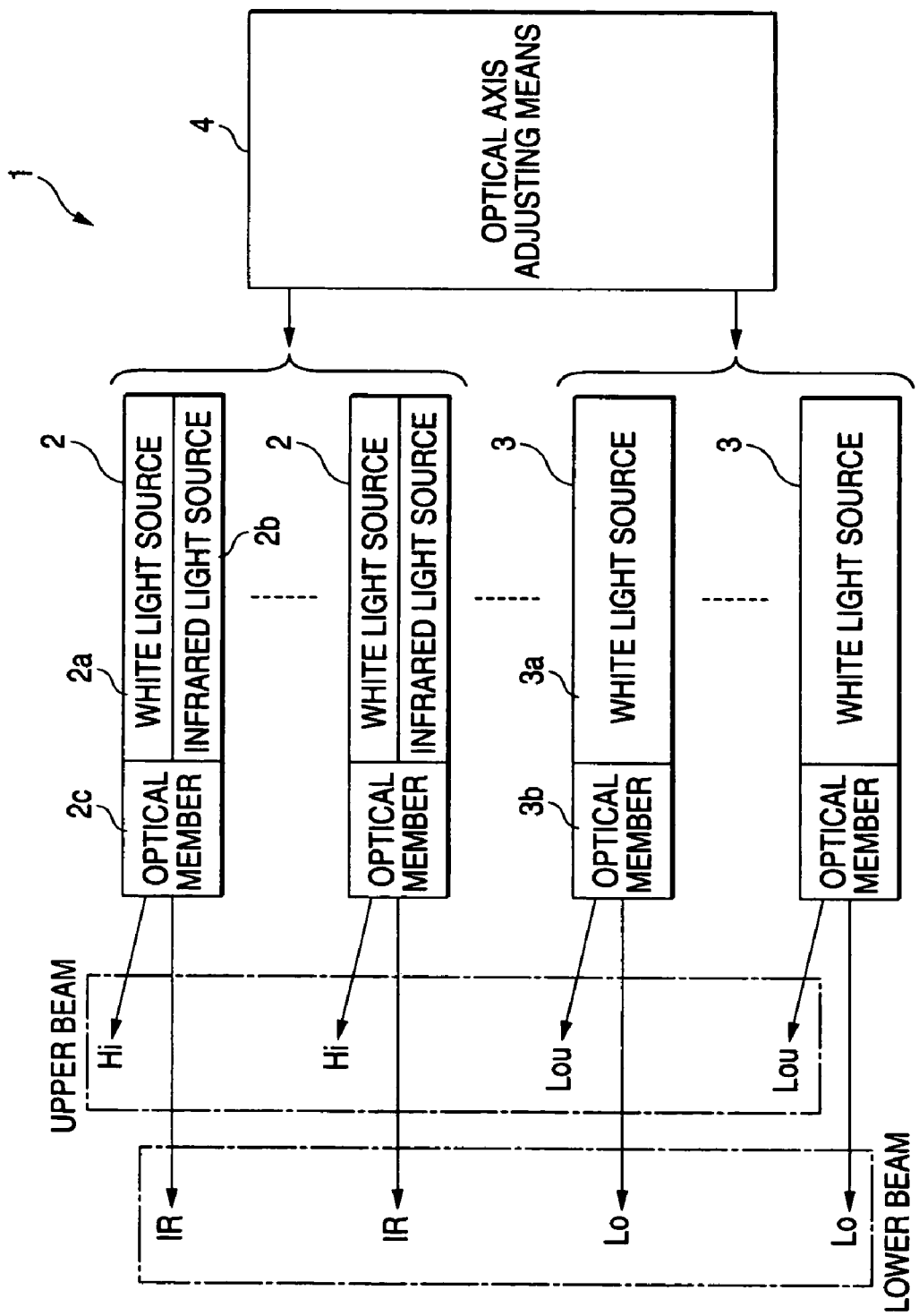
FIG. 1 is a conceptual drawing of a basic configuration of a vehicular headlamp according to an exemplary embodiment of the invention.

FIG. 1 is a conceptual drawing of a basic configuration of a vehicular headlamp according to the exemplary embodiment of the invention.

A vehicular headlamp 1 includes a light source part 2, 2, . . . constituting a first lighting fixture unit, a light source part 3, 3, . . . constituting a second lighting fixture unit, and optical axis adjusting means 4.

The light source parts 2, 2, . . . emit white rays ("Hi" in the figure) in upper beam irradiation and infrared rays ("IR" in the figure) in lower beam irradiation. That is, the light source part 2 includes a white light source 2a and an infrared light source 2b each of which uses a semiconductor light-emitting element, such as an LED. An optical member 2c is provided to irradiate the light from each light source in a forward direction.

The light source parts 3, 3, . . . emit white rays ("Lo" or "Lou" in the figure) in lower beam irradiation and upper beam irradiation. A semiconductor light-emitting element, such as an LED, is used as the light source 3a. An optical member 3b is provided to irradiate the light from the light source in a forward direction.

The optical axis adjusting means 4 is provided to change the optical axis direction of each lighting fixture unit in a vertical plane. This changes the irradiation direction. Exemplary configurations of the optical axis adjusting means include those listed below.

(I) A configuration where an individual optical axis adjusting mechanism is provided for each light source part;

(II) a configuration where a common optical axis adjusting mechanism is provided for the light source parts 2, 2, . . . and a common optical axis adjusting mechanism is provided for the light source parts 3, 3, . . . ; and (III) a configuration where a common optical axis adjusting mechanism is provided for the light source parts 2, 2, . . . and the light source parts 3, 3, . . . .

In the configuration (I), each light source part includes a separate optical axis adjusting mechanism. A combination of each mechanism and a light source part is included in a lighting fixture unit.

In the configuration (II), a common optical axis adjusting mechanism is provided for each of the two types of light source parts. A combination of the mechanism and a plurality of light source parts is included in a lighting fixture unit.

In the configuration (III), all light source arts and a single optical axis adjusting mechanism constitute a lighting fixture unit.

In order to simplify the configuration, (III) is preferable. In particular, a leveling means described later can be used. In the leveling means, not all of the light source parts 3, 3, . . . need to be movable. That is, some of the light source parts 3, 3, . . . may be fixed and others may be movable.

In this configuration, infrared light (refer to "IR") from the light source part 2 and white light (refer to "Lo") from the light source part 3 are emitted during lower beam irradiation. A light distribution pattern where both the infrared light IR and white light Lo are synthesized is formed ahead of a vehicle. This light distribution pattern includes light distribution for passing and infrared light distribution for far irradiation.

In upper beam irradiation, white light (refer to "Hi") from the light source part 2 and white light (refer to "Lou") from the light source part 3 are emitted. A light distribution pattern where both the white light Hi and the white light Lou are synthesized is formed ahead of a vehicle. This is a light distribution for traveling. In this case, the irradiation direction is shifted slightly upward from the reference direction of lower beam irradiation with respect to the white light from the light source parts 2 and 3 by way of the optical axis adjusting means 4.

The light source part 2 of the first lighting fixture unit is used for infrared upper beam irradiation and for lower beam irradiation. The light source part 3 of the second lighting fixture unit is used for upper beam irradiation and for lower beam irradiation.

Figure 2:
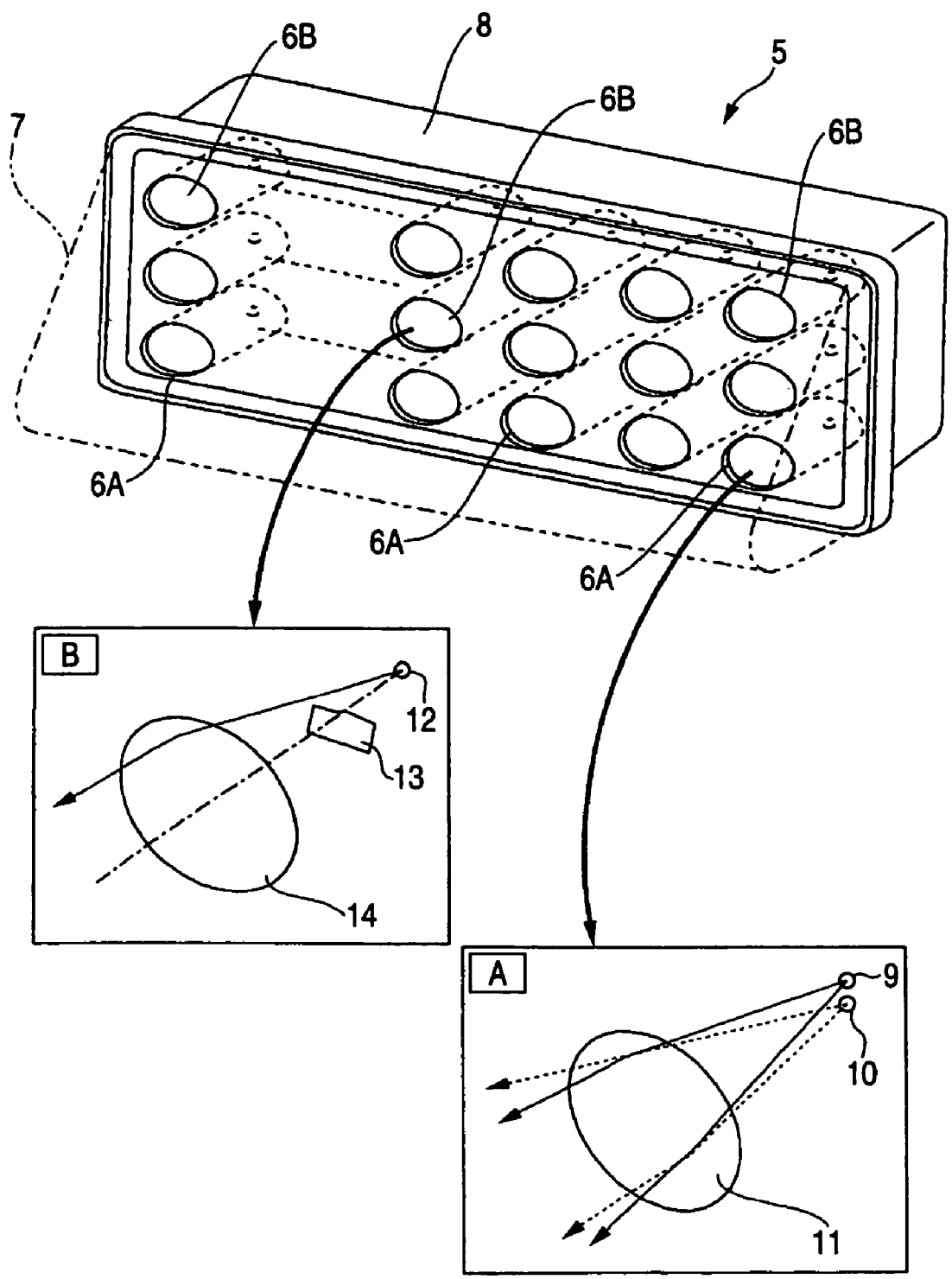
FIG. 2 is a schematic view of a configuration example of the vehicular headlamp according to an exemplary embodiment of the invention.

FIG. 2 is a schematic view of an exemplary configuration 5 of the vehicular headlamp.

The lighting fixture units 6A, 6A, . . . and 6B, 6B, . . . are arranged in a lamp chamber formed by an outer lens (front lens) 7 shown by chain double-dashed lines and a lamp body 8.

For example, first lighting fixture units 6A, 6A, . . . are arranged in a lateral row in the bottom stage seen from the front of a vehicular headlamp 5. As shown, in a rectangular frame "A", a white light source 9, an infrared light source 10 and a lens 11 are provided.

Second lighting fixture units 6B, 6B, . . . are arranged in each row in the top and middle stages seen from the front. As shown, in a rectangular frame "B", a white light source 12, a shade 13 and a lens 14 are provided.

Figure 3:
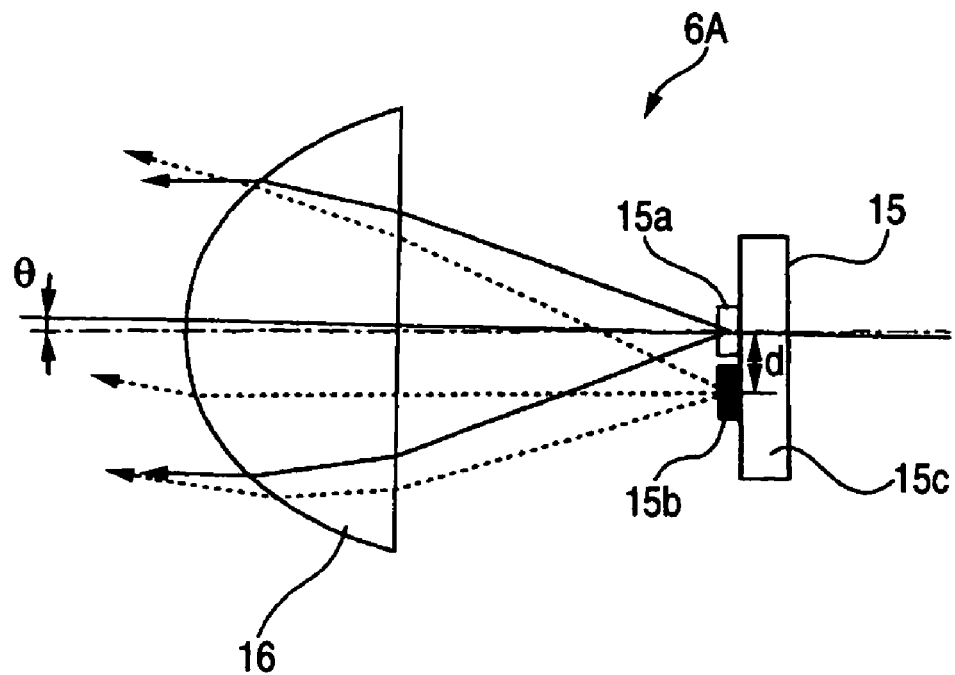
FIG. 3 shows a configuration example of a lighting fixture unit including a white light source and an infrared light source.
Figure 4:
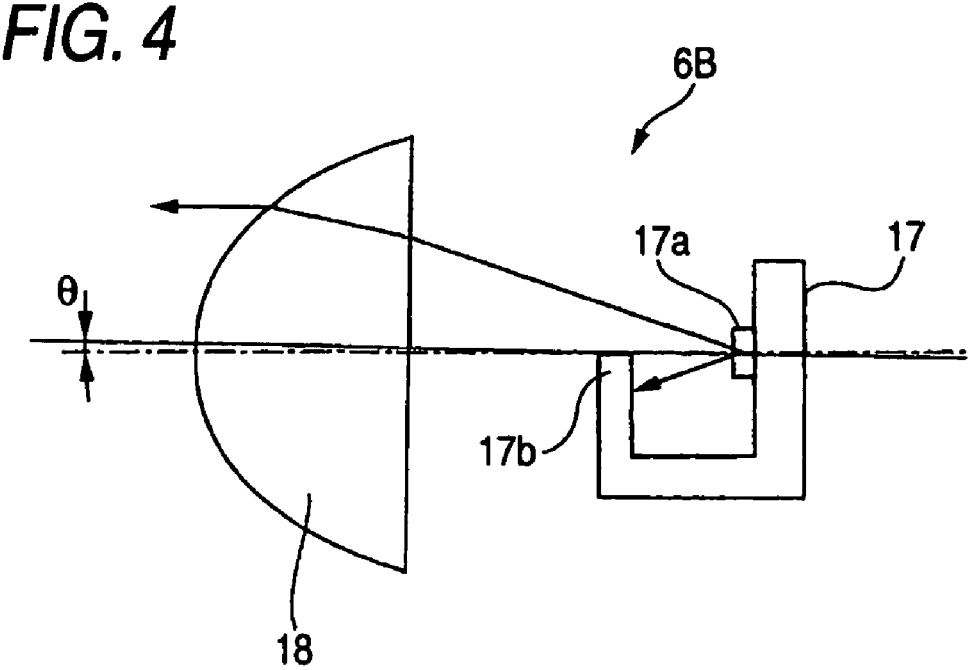
FIG. 4 shows a configuration example of a lighting fixture unit including a white light source.

FIGS. 3 and 4 are schematic illustration of a direct-irradiation configuration of each lighting fixture unit according to an exemplary embodiment.

FIG. 3 shows a vertical cross section of the lighting fixture unit 6A having a light source part 15 including a white light source and an infrared light source, and a projection The light source part 15 includes a first semiconductor light-emitting element 15a for emitting white light and a second semiconductor light-emitting element 15b for emitting infrared light. Light-emitting diodes are used for these semiconductor light-emitting elements. On a case board 15c, both elements are arranged in proximity to each other a predetermined distance "d" apart. The first semiconductor light-emitting element 15a is positioned relatively higher than the second semiconductor light-emitting element 15b, and the semiconductor light-emitting elements 15a, 15b are positioned in close proximity to one another. In the figure, only an LED chip of each element is shown for simplicity, and members such as a shielding resin are not shown.

Light emitted from the semiconductor light-emitting element 15a or 15b passes through the projection lens 16 provided in the front direction of the light source part 15 (irradiation direction) and is emitted therefrom.

In lower beam irradiation, only the lower semiconductor light-emitting element 15b illuminates. As shown in the rays in the figure (refer to broken lines), infrared light emitted from the element is emitted outward through the projection lens 16.

In upper beam irradiation, only the upper semiconductor light-emitting element 15a illuminates. As shown in the rays in the figure (refer to solid lines), white light emitted from the element is emitted outward through the projection lens 16. In this practice, the optical axis of the lighting fixture unit 6A is shifted upward (almost to a horizontal direction) by a predetermined angle "θ" as shown by alternate long and short dashed lines and solid lines. That is, a leveling operation takes place in upper beam irradiation.

FIG. 4 shows a vertical cross section of the lighting fixture unit 6B having a light source part 17 including a white light source and a projection lens 18.

The light source part 17 includes a semiconductor light-emitting element 17a for emitting white light. A light-emitting diode is used for the semiconductor light-emitting element 17a. In the figure, only an LED chip of each element is shown for simplicity, and members such as a shielding resin are not shown.

Between the semiconductor light-emitting element 17a and the projection lens 18 is arranged a light shielding part 17b for forming a cut line (cutoff) specific to lower beam irradiation. In this example, the light shielding part 17b is integrated with the light source part 17 in order to reduce the number of components.

Part of the light emitted from the semiconductor light-emitting element 17a is shielded by the light shielding part 17b, the upper edge of which defines a cut line on a light distribution pattern. That is, in lower beam irradiation, the semiconductor light-emitting element 17a illuminates and part of white light emitted from the element is emitted outward through the projection lens 18.

In upper beam irradiation, the optical axis of the lighting fixture unit 6B is shifted upward (almost to a horizontal direction) by a predetermined angle "θ" as shown by alternate long and short dashed lines and solid lines. That is, a leveling operation takes place in upper beam irradiation. Light having an irradiation direction changed by upward tilting of an optical axis and white light produced by the lighting fixture unit 6A are synthesized to form a light distribution pattern.

Each lighting fixture unit may use a reflective type unit instead of a direct projection type unit, or a combination of a plurality of lighting fixture units of both types in order to obtain a desired light distribution pattern.

Figure 5:
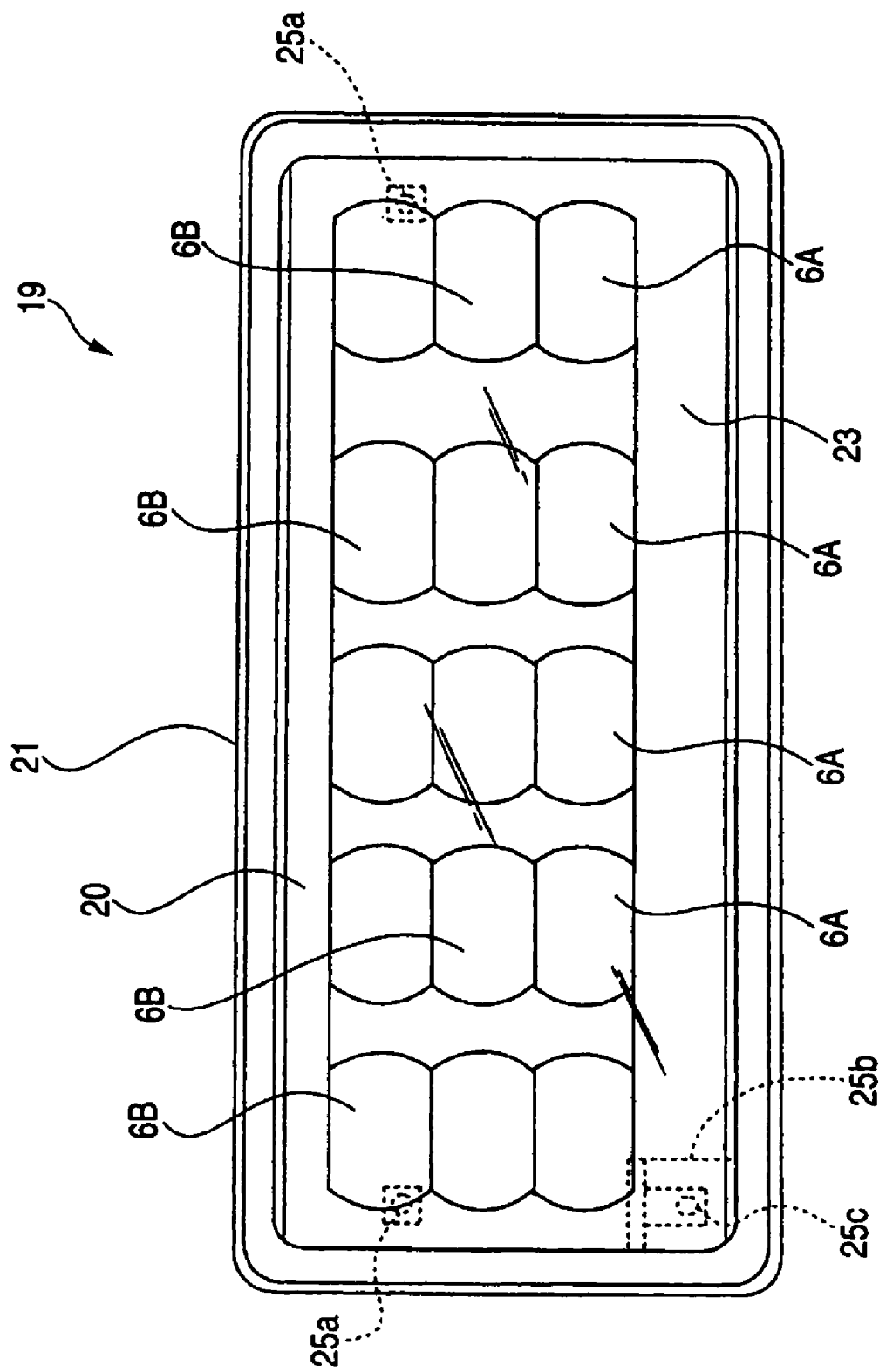
FIG. 5 is a front view of an exemplary embodiment of the invention to a vehicular headlamp.
Figure 6:
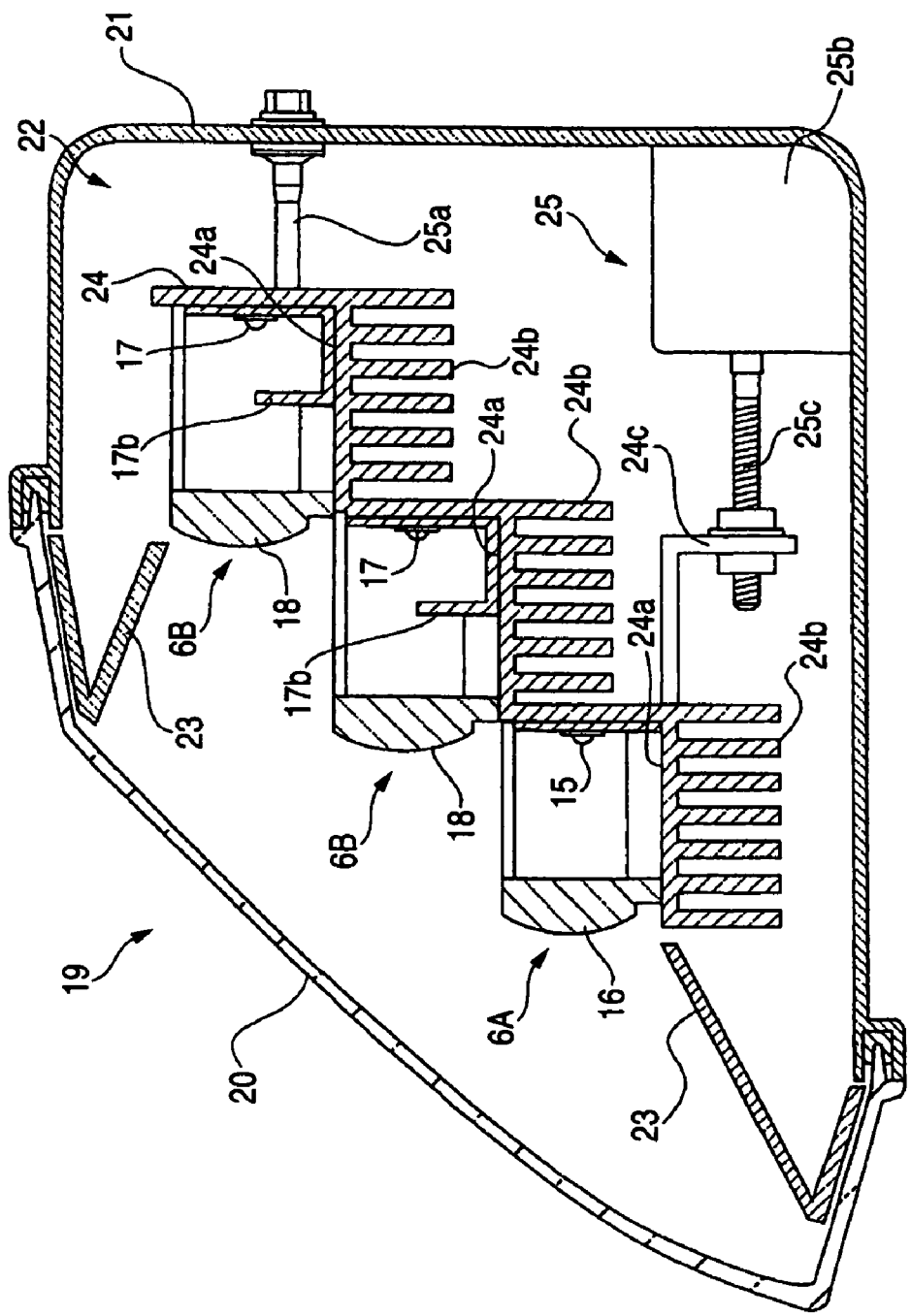
FIG. 6 shows a vertical cross section of an example of application of the invention to a vehicular headlamp.

FIGS. 5 and 6 show an example of application of the invention to a vehicular headlamp. FIG. 5 shows a front view and FIG. 6 a vertical cross section. Concerning the lighting fixture unit described below, the parts similar to those of the lighting fixture unit (6A, 6B) described earlier are given the same signs.

In a vehicular headlamp 19, a plurality of lighting fixture units are arranged in a lamp chamber 22 formed by an outer lens 20 and a lamp body 21.

The outer lens 20 is formed using glass or a transparent synthetic resin. For example, a transparent lens without a lens step formed thereon may be used.

A covering member (extension) 23 is positioned inside the outer lens 20. This member is used to conceal the structure of the lighting fixture from the outside.

The lighting fixture units 6A, 6B are attached to a metallic support member 24. In this example, lighting fixture units 6A, 6B are arranged in three stages in vertical direction. In the bottom stage is mounted the lighting fixture unit 6A and in the middle and top stage are mounted lighting fixture units 6B. That is, on the support member 24, lighting fixture units are mounted on a plurality of base parts 24a, 24a, formed in the shape of a staircase. Heat generated when the light-emitting diodes of the lighting fixture units illuminate is transmitted to heat sinks 24b, 24b arranged under the base parts 24a and is dissipated.

Leveling means 25 is provided for changing the overall irradiation direction of the lighting fixture unit group by changing the posture of the support member 24. The leveling means tiltably supports the support member 24 in a vertical plane. The leveling means 25 comprises members 25a, 25a (serving as a support axis and one of which is shown in FIG. 6) for mounting the support member on the lamp body 21 and an actuator 25b, 25c for adjusting the leveling.

A joint part 24c formed on the rear surface of the support member 24 is attached to the main body 25b (including a drive part such as a motor) of the actuator by way of a movable part 25c (including a threaded shaft part) of the actuator. Receiving an instruction from a control circuit (not shown), the joint part 24c changes the drive amount of the actuator so as to change the tilt posture of the support member 24 mounting all lighting fixture units. Thus, each lighting fixture unit has its irradiation direction changed simultaneously by the same control amount.

Figure 7:
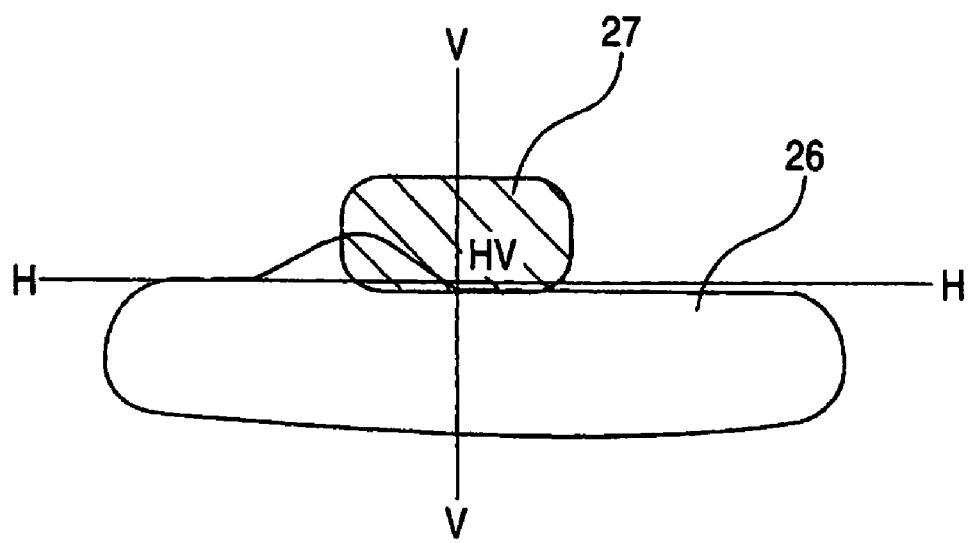
FIG. 7 is an explanatory drawing related to the formation of a light distribution pattern in lower beam irradiation.
Figure 8:
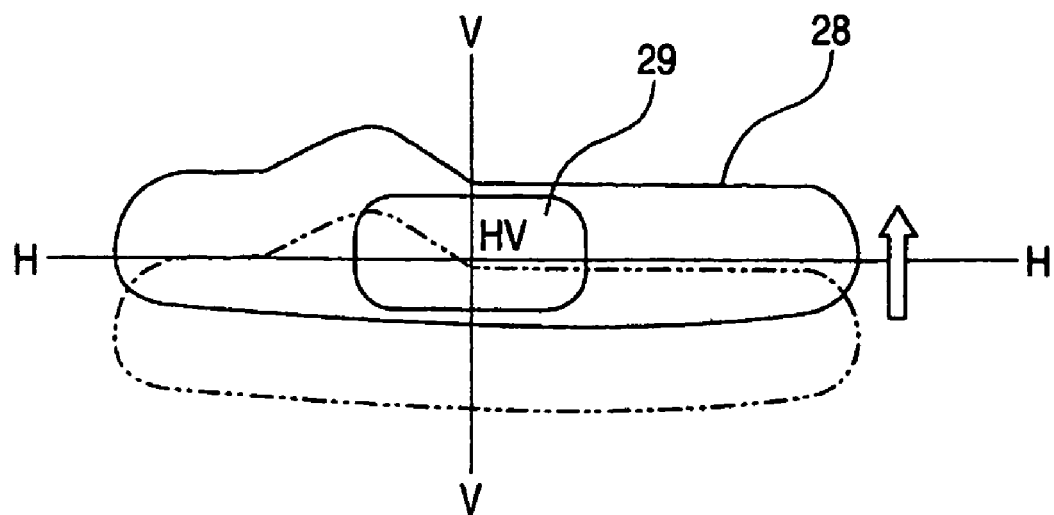
FIG. 8 is an explanatory drawing related to the formation of a light distribution pattern in upper beam irradiation.

FIGS. 7 and 8 are schematic illustrations of formation of a light distribution pattern by a vehicular headlamp 19. FIG. 7 shows lower beam irradiation (including infrared irradiation) and FIG. 8 shows upper beam irradiation. In these figures, the line "H-H" represents a horizon while the line "V-V" represents a vertical line (plumb line) and the point "HV" represents an intersection of the two.

As shown in FIG. 7, a pattern 26 having a cut line specific to lower beams is formed. An infrared light pattern 27 is formed by the lighting of the infrared LED of the lighting fixture unit 6A.

The irradiation range related to the infrared light pattern 27 mainly encompasses a far region including the point "HV". This range is used by a noctovision camera system.

As described referring to FIG. 3, the semiconductor light emitting element 15b is positioned slightly below the semiconductor light-emitting element 15a. The infrared light pattern 27 is formed light slightly upward with respect to the horizon "H-H" as understood from the image reversal caused by the projection by the projection lens 16. The infrared pattern 27 is positioned above a pattern that is assumed to be projected forward in case the semiconductor light-emitting element 15a is illuminated.

Referring to FIG. 8, a pattern 28 shifted upward through leveling control of the pattern 26 and a pattern 29 formed by lighting of the semiconductor light-emitting element 15a (white LED) of the lighting fixture unit 6A are synthesized to form a light distribution pattern of the entire upper beams.

The pattern 29 obtained by the lighting of the semiconductor light-emitting element 15a has its irradiation pattern adjusted upward by the leveling control mentioned above and its irradiation range has a predetermined expanse around the point "HV" and includes a far region.

As mentioned above, with a configuration where a white light-emitting element for upper beam irradiation and an infrared light-emitting element for lower beam irradiation are packaged, simultaneous lighting of these elements is avoided. As a result, it is not necessary to increase the capacity of a heat sink in the heat-radiating design. In other words, a designer need not consider the total sum of the calorific values of the elements but has only to make a heat-radiating design based on whichever element has the greater calorific value.

In upper beam irradiation, leveling control related to the lighting fixture unit 6A including the white light-emitting element and that related to the lighting fixture unit 6B are executed simultaneously to obtain a light distribution pattern of the entire upper beams. When the same movable mechanism is used for leveling control of the lighting fixture units, the irradiation direction of each of the units needs to be adjusted only by the same change amount, which is an extremely simple mechanism.

While the invention has been described with reference to the exemplary embodiment, the technical scope of the invention is not restricted to the description of the exemplary embodiment. It is apparent to the skilled in the art that various changes or improvements can be made. It is apparent from the description of claims that the changed or improved configurations can also be included in the technical scope of the invention.

What is claimed is:

1. A lighting fixture unit that emits white light in upper beam irradiation of a vehicular headlamp and emits infrared light in lower beam irradiation of the vehicular headlamp, said lighting fixture unit comprising:
   a light source part including a first semiconductor light-emitting element for emitting said white light and a second semiconductor light-emitting element for emitting said infrared light;
   an optical member for irradiating in a forward direction the white light from the first semiconductor light-emitting element or the infrared light from the second semiconductor light-emitting element; and
   optical axis adjusting means for changing in a vertical plane a direction of an optical axis related to the first and second semiconductor light-emitting elements;
   wherein:
   the first semiconductor light-emitting element comprises a light-emitting diode,
   the second semiconductor light-emitting element comprises a light-emitting diode,
   the first semiconductor light-emitting element is positioned higher than the second semiconductor light-emitting element,
   the first and second semiconductor light-emitting elements are positioned in close proximity on a same board, and
   said white light or infrared light passes through a lens, is emitted forward, and has its irradiation direction adjusted upward in upper beam irradiation compared with its irradiation direction in lower beam irradiation.

2. A vehicular headlamp, comprising:
   a first lighting fixture unit that is configured to emit white light in upper beam irradiation and to emit infrared light in lower beam irradiation, said first lighting fixture unit comprising:
      a light source part including a first semiconductor light-emitting element for emitting white light and a second semiconductor light-emitting element for emitting infrared light;
      an optical member for refracting and irradiating in a forward direction the white light from the first semiconductor light-emitting element or the infrared light from the second semiconductor light-emitting element;
      an optical axis adjusting means for changing in a vertical plane a direction of an optical axis related to the first and second semiconductor light-emitting elements;
   a second lighting fixture unit that is configured to emit light in upper beam irradiation and lower beam irradiation; and
   a means for shifting an irradiation direction of said second lighting fixture unit upward in upper beam irradiation compared with its irradiation direction in lower beam irradiation.

3. The vehicular headlamp according to claim 2, wherein said optical adjusting means is also used as a leveling means in order to tilt upward the optical axis of said first semiconductor light-emitting element and the irradiation optical axis of said second lighting fixture unit in upper beam irradiation.

4. The vehicular headlamp according to claim 2, wherein the second semiconductor light-emitting element emits infrared light sufficient for detection by a noctovision camera system.

5. The vehicular headlamp according to claim 2, wherein the lower beam irradiation comprises a beam for passing.

6. The vehicular headlamp according to claim 5, wherein the upper beam irradiation comprises a beam for traveling.

7. The vehicular headlamp according to claim 2, wherein the first lighting fixture unit is configured to emit the upper beam irradiation farther than the lower beam irradiation.

8. The vehicular headlamp according to claim 7, wherein the second lighting fixture unit is configured to emit the upper beam irradiation farther than the lower beam irradiation.

9. The vehicular headlamp according to claim 2, wherein the first semiconductor light-emitting element is configured such that the first semiconductor light-emitting element does not emit the white light in the lower beam irradiation; and wherein the second semiconductor light-emitting element is configured such that the second semiconductor light-emitting element does not emit the infrared light in the upper beam irradiation.

10. A vehicular headlamp, comprising:

a first lighting fixture unit including a first semiconductor light-emitting element for emitting white light and a second semiconductor light-emitting element for emitting infrared light;

an optical member for refracting and irradiating in a forward direction light emitted from the light source part; and an actuator for changing, in a vertical plane, a direction of an optical axis related to the first and second semiconductor light-emitting elements;

wherein the first lighting fixture unit is configured to emit light in upper beam irradiation and lower beam irradiation; and further comprising a second lighting fixture unit that is configured to emit light in upper beam irradiation and lower beam irradiation;

wherein the actuator shifts an irradiation direction of the first lighting fixture upward in upper beam irradiation compared with its irradiation direction in lower beam irradiation, and shifts an irradiation direction of the second lighting fixture unit upward in upper beam irradiation compared with its irradiation direction in lower beam irradiation.

11. The vehicular headlamp according to claim 10, wherein:

the first semiconductor light-emitting element comprises a light-emitting diode, the second semiconductor light-emitting element comprises a light-emitting diode, the first semiconductor light-emitting element is positioned higher than the second semiconductor light-emitting element, and the first and second semiconductor light-emitting elements are positioned in close proximity on a same board.

12. The vehicular headlamp according to claim 11, wherein the light from the first light source part:

passes through a lens, is emitted forward, and has its irradiation direction adjusted upward in upper beam irradiation compared with its irradiation direction in lower beam irradiation.

13. The vehicular headlamp according to claim 10, wherein the second semiconductor light-emitting element emits infrared light sufficient for detection by a noctovision camera system.

14. The vehicular headlamp according to claim 10, wherein the lower beam irradiation comprises a beam for passing.

15. The vehicular headlamp according to claim 14, wherein the upper beam irradiation comprises a beam for traveling.

16. The vehicular headlamp according to claim 10, wherein the first lighting fixture unit is configured to emit the upper beam irradiation farther than the lower beam irradiation.

17. The vehicular headlamp according to claim 16, wherein the second lighting fixture unit is configured to emit the upper beam irradiation farther than the lower beam irradiation.

18. The vehicular headlamp according to claim 10, wherein the first semiconductor light-emitting element is configured such that the first semiconductor light-emitting element does not emit the white light in the lower beam irradiation; and wherein the second semiconductor light-emitting element is configured such that the second semiconductor light-emitting element does not emit the infrared light in the upper beam irradiation.

* * * * *